Oct. 3, 1961     H. G. LIMMER     3,002,546
REINFORCED TIRE CONSTRUCTION
Filed Dec. 2, 1958
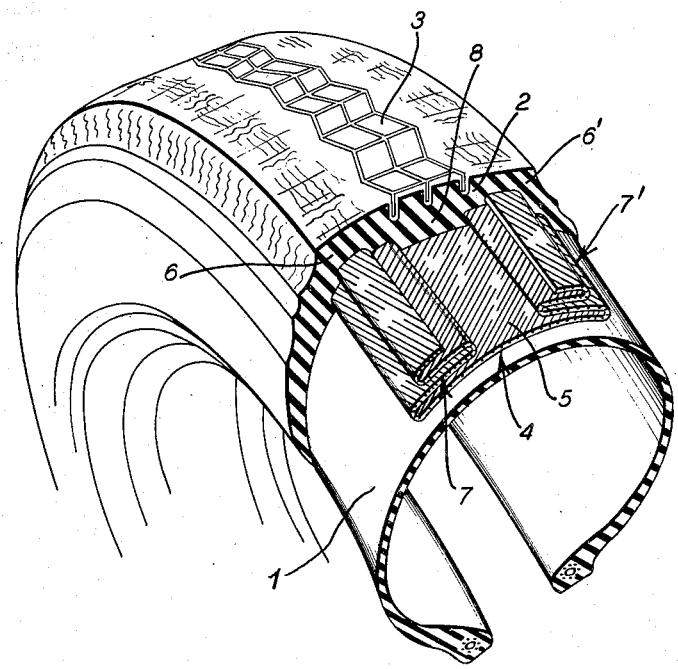
INVENTOR.
HANS G. LIMMER
BY
ATTORNEYS … # 3,002,546
REINFORCED TIRE CONSTRUCTION
Hans G. Limmer, Waiblingen, Germany, assignor to Friedrich K. H. Nallinger, Stuttgart, Germany
Filed Dec. 2, 1958, Ser. No. 777,710
Claims priority, application Germany Dec. 10, 1957
5 Claims. (Cl. 152—361)

The present invention relates to pneumatic tires for vehicles of all types, especially motor vehicles, which are provided with a reinforcing inlay or insert arranged between the body members of the tire and the tread portion thereof in the form of wires, filaments, cords, bands, woven strips or the like, made, for example, of steel, metal, synthetic material or natural fiber as more fully described in the copending application Serial No 767,874, entitled "Tire Construction" and filed October 17, 1958, in the name of Friedrich K. H. Nallinger, the assignee of the present application.

More particularly, the present invention relates to a further improvement of the type of tire described hereinabove and in the aforementioned copending application, the contents of which are incorporated herein by reference, such type of tire including an insert or inlay arranged between the body portion and the tread portion of the tire, and essentially consists in that several insert layers are made from a single fabric strip of corresponding width by folding the same in the longitudinal direction thereof.

By the use of an arrangement in accordance with the present invention, a simplification in the construction and in the manufacture of reinforcing inserts or inlays is obtained, while, simultaneously therewith, it is possible to achieve an arrangement in which the threads or wires of the insert layers cross one another in the reinforcing insert or inlay in a particularly simple manner for purposes of increasing the rigidity thereof.

In order to obtain favorable cross-sectional transitions between the parts of the tire provided with reinforcing inserts and those consisting only of rubber, the width of the folded-over portions of the fabric material may decrease in a step-like manner in the direction toward the outer surface of the tire.

With pneumatic tires having two reinforcing inserts symmetrically disposed with respect to the center line of the tire cross section, the folded-over portions of both reinforcing inserts may be arranged mirror-image like with respect to each other. Furthermore, both reinforcing inserts may also be made from a single fabric strip folded over along both longitudinal sides or edges thereof.

Accordingly, it is an object of the present invention to provide a pneumatic tire having a reinforcing insert which may be made in a simple and economic manner and which exhibits advantageous characteristics in the operation thereof.

It is another object of the present invention to provide a pneumatic tire having particularly favorable transitions of the cross sectional areas of the tire thereof between those parts provided with reinforcing inserts and those consisting essentially only of rubber.

Still another object of the present invention is the provision of reinforcing inserts which reinforce the tire when passing through a curve while leaving essentially unaffected the spring characteristics of the tire when proceeding with a straight drive so as to offer relatively soft spring characteristics during the latter drive conditions.

These and other objects, features and advantages will become more obvious from the following description when taken in connection with the accompanying drawing, which shows, in the single figure thereof, a perspective view, partly in cross section and partly exploded, of a tire in accordance with the present invention so as to show with greater clarity the details thereof.

Referring now to the drawing, reference numeral 1 designates therein the body portion of the pneumatic tire, whereas reference numeral 2 designates the tread portion thereof. The tread portion 2 of the tire is provided with an outer or running surface 3 having any suitable conventional pattern on the outside thereof. A reinforcing insert generally designated by reference numeral 4 is arranged between the body portion 1 and the tread portion 2, which reinforcing insert 4 consists of a single fabric strip 5. The fabric strip 5 extends essentially from one shoulder 6 of the tire to the other tire shoulder 6'. Within the region of the tire shoulders 6 and 6', the folded-over fabric strip 5 forms the reinforcing rim portions generally designated by reference numerals 7 and 7' by folding the fabric strip 5 several times in a step-like manner in the longitudinal direction thereof in such a way that the width of the reinforcing insert or of the rim reinforcements 7 and 7' decrease in the direction toward the outer surface 3 of the tire.

In the embodiment illustrated herein, the rim reinforcing portions 7 and 7' are obtained within the region of the tire shoulders 6 and 6' by folding over the fabric strip 5 three times. A reinforcement of the reinforcing rim portions 7 and 7' may be obtained without any special expenses or efforts while simultaneously retaining essentially the same elasticity in the center portion 8 of the tread portion 2 of the tire by increasing the number of pleats or folded-over portions.

Appropriately the fabric strip 5 is made of rubberized threads which form an angle with respect to the peripheral center line of the tire. The present invention makes possible by each folded-over portion within the region of the tire shoulders 6 and 6', as may be clearly seen from the drawing, that the threads of the folded-over layers of the fabric strip 5 cross one another within the reinforcing rim portions 7 and 7'.

While I have shown and described one preferred embodiment in accordance with the present invention, it is understood that the same is not limited thereto but is susceptible of many changes and modifications within the spirit and scope of the present invention, and I, therefore, do not wish to be limited to the illustrated embodiment but intend to cover all such changes and modifications as are encompassed by the scope of the appended claims.

I claim:

1. A pneumatic tire for vehicles of all types, especially motor vehicles, comprising a body portion, a tread portion having lateral tire shoulders, and reinforcing insert means arranged between said body portion and said tread portion, said insert means comprising a fabric strip having a radially innermost portion thereof of a width extending from shoulder to shoulder, said fabric strip further comprising an insert portion including a plurality of folded-over portions thereof within the region of each of said tire shoulders, the lengths of said folded-over portions extending in the circumferential direction of said tire, said folded-over portions being superposed with respect to said innermost portion and to each other in directions radially outward of said innermost portion, the widths of said folded-over portions progressively decreasing in said last-named directions.

2. A pneumatic tire according to claim 1, wherein the widths of successive ones of said folded-over portions of said insert means decrease in a step-like manner in said last-named directions.

3. A pneumatic tire according to claim 1, wherein each said plurality of folded-over portions is arranged with respect to the center line of the tire in the manner of a mirror-image of the other of said plurality of folded-over portions.

4. A pneumatic tire for vehicles of all types, especially motor vehicles, comprising a body portion, a tread portion with lateral tire shoulders, and reinforcing insert means arranged between said body portion and said tread portion, said insert means being located within the region of said lateral tire shoulders and formed from a single fabric strip having a radially innermost portion of a width extending from shoulder to shoulder, said innermost portion having folded-over portions on opposite sides of said innermost portion, said folded-over portions extending in the circumferential direction of the tire within the regions of said tire shoulders, the width of successive folded-over portions decreasing in width in the direction toward the outside of the tire.

5. A pneumatic tire according to claim 4, wherein said folded-over portions on opposite sides are arranged in a mirror-image-like manner within the regions of both tire shoulders.

References Cited in the file of this patent

UNITED STATES PATENTS

| | | |
|---|---|---|
| 1,040,920 | Fiske | Oct. 8, 1912 |
| 1,339,868 | Subers | May 11, 1920 |

FOREIGN PATENTS

| | | |
|---|---|---|
| 700,435 | Great Britain | Dec. 2, 1953 |